United States Patent [19]

Widhalm et al.

[11] Patent Number: 4,692,845

[45] Date of Patent: Sep. 8, 1987

[54] FLIP-OVER LAMP BRACKET FOR VEHICLES

[76] Inventors: Michael J. Widhalm, 16900 Yolite St., NW., Anoka, Minn. 55303; Thomas G. Widhalm, 1322 119th La., Coon Rapids, Minn. 55433

[21] Appl. No.: 850,823

[22] Filed: Apr. 11, 1986

[51] Int. Cl.$^4$ .............................................. B60Q 1/00
[52] U.S. Cl. ...................................... 362/80; 362/70; 362/61; 362/66
[58] Field of Search ...................... 362/80, 61, 66, 67, 362/70, 72, 73; 340/132, 87

[56] References Cited

U.S. PATENT DOCUMENTS

| | | | |
|---|---|---|---|
| 3,229,945 | 1/1966 | Hartmann | 362/70 |
| 3,331,957 | 7/1967 | Adams et al. | 362/61 |
| 3,761,890 | 9/1973 | Fritts et al. | 362/66 |
| 3,783,267 | 1/1974 | Thomas | 362/80 |
| 4,180,010 | 12/1979 | McDermott et al. | 362/80 |
| 4,192,427 | 3/1980 | Bergman | 362/80 |
| 4,259,660 | 3/1981 | Oliver | 362/66 |
| 4,473,868 | 9/1984 | Moore | 362/80 |

Primary Examiner—Raymond A. Nelli
Attorney, Agent, or Firm—Peterson, Wicks, Nemer & Kamrath

[57] ABSTRACT

A flip-over bracket includes two channel-shaped members connected together by means of a hinge having one leaf thereof secured to one of said channel-shaped members and the other leaf thereof secured to the other of said channel-shaped members. A pair of coil springs act in a manner so that said second channel-shaped member is pulled into an overlapping relationship with said first channel-shaped member to aim an auxiliary lamp mounted on said second channel-shaped member in one direction or to cause said second channel-shaped member to assume an extended relationship with said first channel-shaped member to aim said auxiliary lamp in an opposite direction. In this way, when the bracket is mounted on the roll bar of a pickup truck, each bracket having an auxiliary lamp mounted thereon can be flipped through 180° so that its auxiliary lamp will direct light either forwardly or rearwardly. When more than one bracket is utilized, the user has a choice in selecting which direction each individual auxiliary lamp faces.

6 Claims, 6 Drawing Figures

FLIP-OVER LAMP BRACKET FOR VEHICLES

BACKGROUND OF THE INVENTION

This invention relates generally to auxiliary lamps for vehicles, and pertains more particularly to a bracket capable of being flipped through 180° so that the light from the lamp mounted thereon can be directed either forwardly or rearwardly; it is planned that the bracket be attached to the vehicle's roll bar.

It has become increasingly common to mount auxiliary lamps on vehicles, especially on the roll bars of pickup trucks. The additional light from such lamps can be very helpful in that the vehicle's headlights are not always adequate. The vehicle's back-up lights are even less adequate. Consequently, auxiliary lamps have been employed to supplement the illumination normally provided by the headlights and the back-up lights. While the additional illumination and the concomitant increase in visibility are usually well worth the extra investment in lamps, nonetheless, the dual use of both forwardly aimed and rearwardly aimed lamps doubles the cost where the rearwardly directed auxiliary lamps are of the same size as the forwardly directed ones.

SUMMARY OF THE INVENTION

One object of the invention is to permit the operator of a vehicle equipped with out bracket-mounted auxiliary lamps to flip the lamps from an upright position to an inverted position so as to provide a greater amount of clearance, such as when the vehicle enters a garage or a car wash.

Another object of our invention is to make a more efficient and effective utilization of auxiliary lights on a vehicle. More specifically, an aim of the invention is to employ the same auxiliary lamps when the vehicle is driven either forwardly or rearwardly.

A more specific object is to provide a bracket for attachment to the roll bar of a vehicle, the bracket having a flippable capability so that the light from the auxiliary lamp mounted thereon can be selectively directed either forwardly or rearwardly. When the vehicle constitutes a pickup truck, for instance, the truck may be driven rearwardly in preparation for unloading material from its box, a requisite amount of rearwardly directed light then being needed. Also, when the vehicle is used to pull a boat from a body of water during nighttime or twilight hours, a sufficient amount of rearwardly directed light is also important. Our invention permits the rapid reversal of direction as far as auxiliary lamps when mounted on brackets fabricated in accordance with our invention.

Inasmuch as it is customary to employ at least two auxiliary lamps, another object of our invention is to permit the user to adjust one bracket so that the lamp mounted thereon is aimed forwardly, and to adjust the other bracket so that its lamp is facing rearwardly. In this way, when the vehicle is employed, say, for snow-plowing and is alternately moving forwardly and rearwardly, the driver's view is enhanced in both directions by reason of the oppositely aimed auxiliary lamps. Hence, depending upon the number of auxiliary lamps mounted on a vehicle, our invention permits a considerable amount of versatility to be derived as far as selected aiming of the light (or lights).

Yet another object of the invention is to provide brackets that can be inexpensively manufactured so as to encourage the widespread use thereof. In this regard, it is an aim of the invention to reduce the cost of auxiliary lamps by 50% in that only half as many lamps are required for most types of vehicle operation.

Also, the invention has for an object the provision of a bracket that can be readily attached to the vehicle, more specifically to the roll bar of a pickup truck. Not only can the bracket itself be readily attached to the vehicle, but it is also planned that each auxiliary lamp be easily attached to the bracket on which it is to be mounted.

Still further, an object of the invention is to provide a bracket with a flip-over capability that will be rugged and long lasting.

Another object of the invention is to provide a bracket for an auxiliary lamp that can be easily and quickly flipped back and forth, yet automatically retained in whatever flipped position the user selects. It is also within the purview of the invention to have the lamp, when mounted on a bracket of the envisaged type, securely retained in whatever adjusted position it has been moved into, the holding action being such that the individual lamp will not be subjected to any greater vibration than if it were directly mounted on the vehicle in a conventional manner.

The invention also has for still another object the provision of a bracket that will be aesthetically pleasing and relatively inconspicuous, as well as useful.

Briefly, our invention envisions a plurality of auxiliary lamps, each mounted on a flip-type bracket. When the bracket is attached to a sufficiently elevated cross member, such as the roll bar of a pickup truck, each auxiliary lamp can be individually aimed either forwardly or rearwardly, depending upon the circumstances at hand, so as to provide the best possible illumination for the specific task to be undertaken. When operating conditions change, the driver of the vehicle equipped with out bracket (or brackets) can readily change the direction (or directions) in which the light face. By means of an over center spring action, each auxiliary lamp is firmly held in whatever position is selected for that particular lamp.

DESCRIPTION OF THE PREFERRED EMBODIMENT

Figure 1:
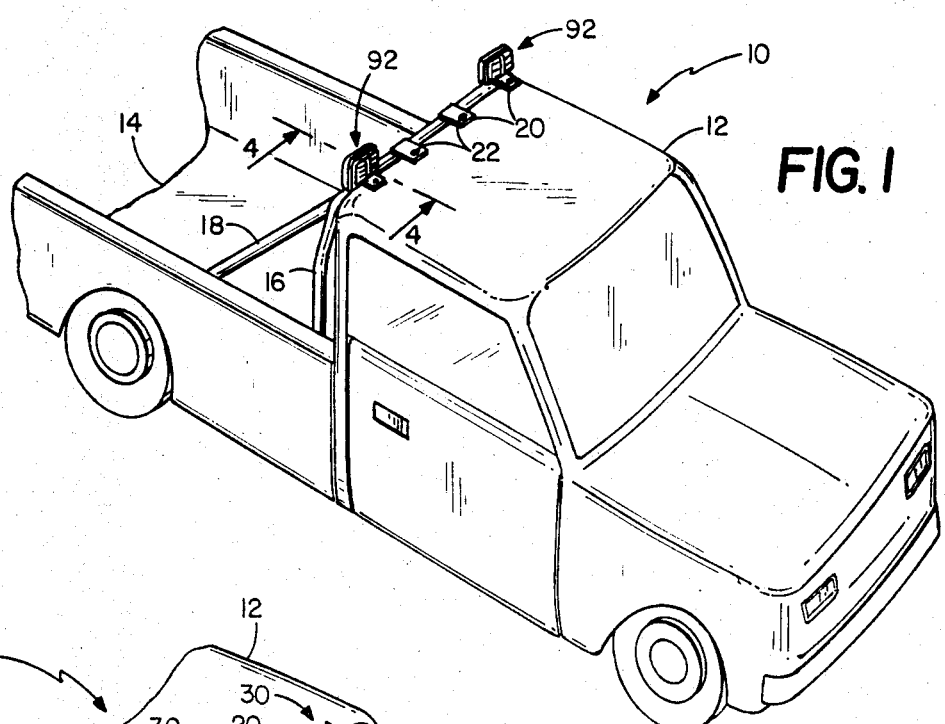
FIG. 1 is a perspective view of a pickup truck having two of our brackets attached to the truck's roll bar, both of the lamps facing forwardly.
Figure 2:
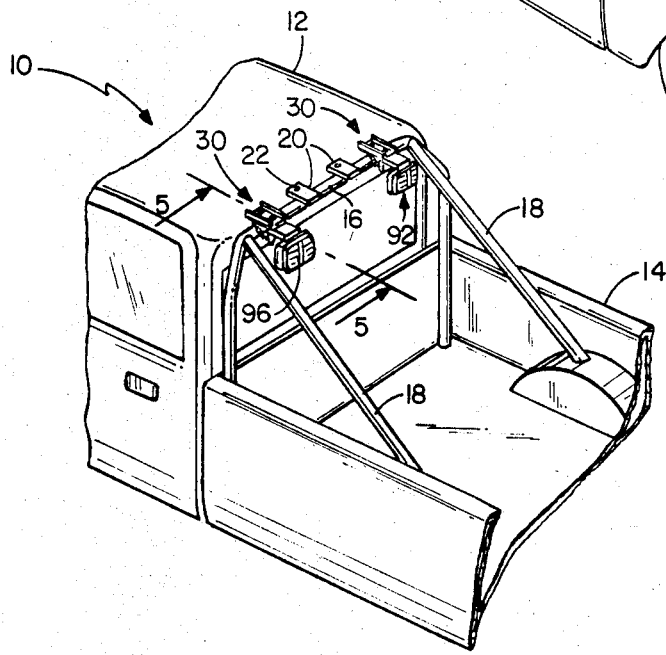
FIG. 2 is a fragmentary perspective view of the truck appearing in FIG. 1, the brackets having been flipped over so that the auxiliary lamps are facing rearwardly.
Figure 3:
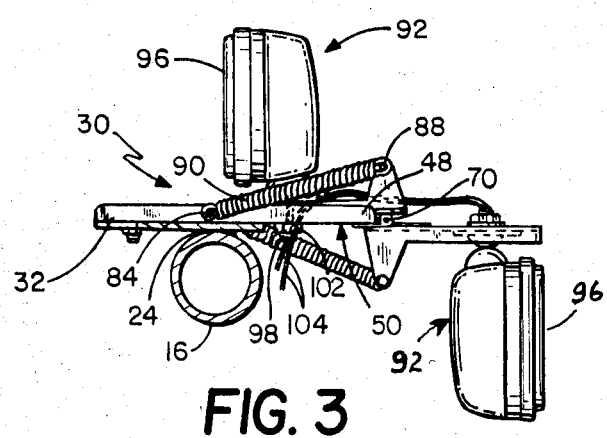
FIG. 3 is an enlarged side elevational view with one lamp aimed forwardly and the other rearwardly.

Referring now to FIGS. 1, 2 and 3, a conventional pickup truck has been denoted generally by the reference numeral 10, having a cab 12 and a box 14. In this instance, the box 14 is provided with an inverted U-shaped roll bar 16 and angled braces 18. As is typical, the roll bar 16 is provided with a number of support pads 20, four such pads 20 being pictured. Each support pad has a mounting hole 22 formed therein. Each support pad 20 is welded to the roll bar 16 at spaced locations thereacross, the welding having been designated by the reference numberal 24 in FIGS. 4 and 5.

Describing now a bracket indicated generally by the reference numeral 30, the bracket 30 exemplifying our invention. In this regard, the bracket 30 comprises a first channel-shaped member 32 having a web or base plate 34. To facilitate a later description of the invention, the opposite ends of the web or plate 34 have been assigned the reference numerals 36 and 38. The member 32, being channel-shaped, has upstanding flanges 40 extending along its opposite sides. It will be perceived that there is a relatively small mounting hole 42 for the accommodation of a bolt 44 (best viewed in FIGS. 4 and 5) and a nut 46. In that the bolt 44 extends downwardly through the previously mentioned hole 22 in the support pad 20, the channel-shaped member 32 is securely attached to the pad 20. The web or base plate 34 has an additional hole 48, which is somewhat larger than the hole 42, the hole 48 enabling wiring to extend therethrough as will become manifest hereinafter.

A second channel-shaped member 50, approximately half the length of the first channel-shaped member 32, has a web or base plate 52 with the ends thereof having been designated by the reference numerals 54 and 56. The web or base plate 52 is provided with flanges 58 (upstanding in FIG. 4 and depending in FIG. 5). The width of the channel-shaped member 50 is slightly less than that of the channel-shaped member 32 so that the flanges 58 can be received within the flanges 40. The web or base plate 52 is formed with a mounting hole 60 for an auxiliary lamp yet to be referred to.

At this time, attention is drawn to a hinge unit 70 having a first leaf 72 and a second leaf 74, each leaf being provided with a set of integral knuckles 76 which when mated enable a hinge pin 78 to extend therethrough. To facilitate a complete understanding of the benefits to be derived from our invention, it will be helpful to assign the reference numeral 80 to the edge of the leaf 72 remote from its knuckles 76, and to assign the reference numeral 82 to the edge of the leaf 74 that is remote from its knuckles 76. As perhaps best understood from FIG. 5, the leaf 72 is spot welded to the underside of the web or base plate 34 belonging to the channel-shaped member 32, the knuckles 76 integral with this leaf 72 being closely adjacent the end 36 of the web or base plate 34. On the other hand, the leaf 74 is spot welded to the web or base plate 52 of the channel-shaped member 50 so that the edge 82 is spaced a considerable distance from the end 54. Although not fully comprehendible at this stage, it will later be recognized that the leaf 74 limits the pivotal movement of the channel-shaped member 50 relative to the channel-shaped member 32 (such as that appearing in FIG. 4).

What might be termed anchoring pins or pegs 84 issue outwardly from the opposite sides of the flanges 40 belonging to the channel-shaped member 32. The inner end of one such peg 84 can be seen in FIGS. 4 and 5. All that need be appreciated is that each peg 84 is fixedly mounted, such as by welding, to the particular flange 40 with which it is associated. A peg 84 can also be seem in FIGS. 2 and 3, although the drawing scale of these two figures does not lend itself readily to a clear-cut showing of the peg 84.

Figure 6:
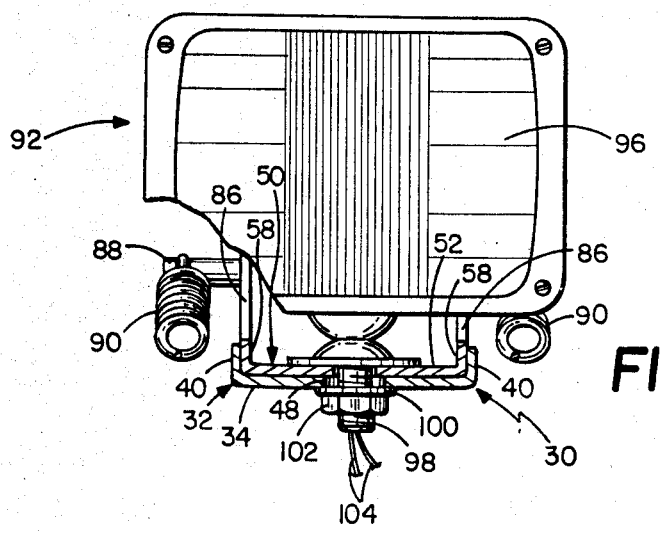
FIG. 6 is a transverse sectional view taken in the direction of view 6—6 of FIG. 4, the lower left-hand portion of the lamp having been broken away in order to expose one of the pins.

Integral with each of the flanges 58 on the web or base plate 52 of the channel-shaped member 50 is an upstanding arm or ear 86. Here again, a pin or a peg 88 extends outwardly from each of the ears 86. In other words, there are two oppositely issuing pegs 88 corresponding to the previously mentioned pegs 84, one of which pegs 88 is made visible in FIG. 6 by removing the lower left-hand portion of a lamp hereinafter referred to.

Figure 4:
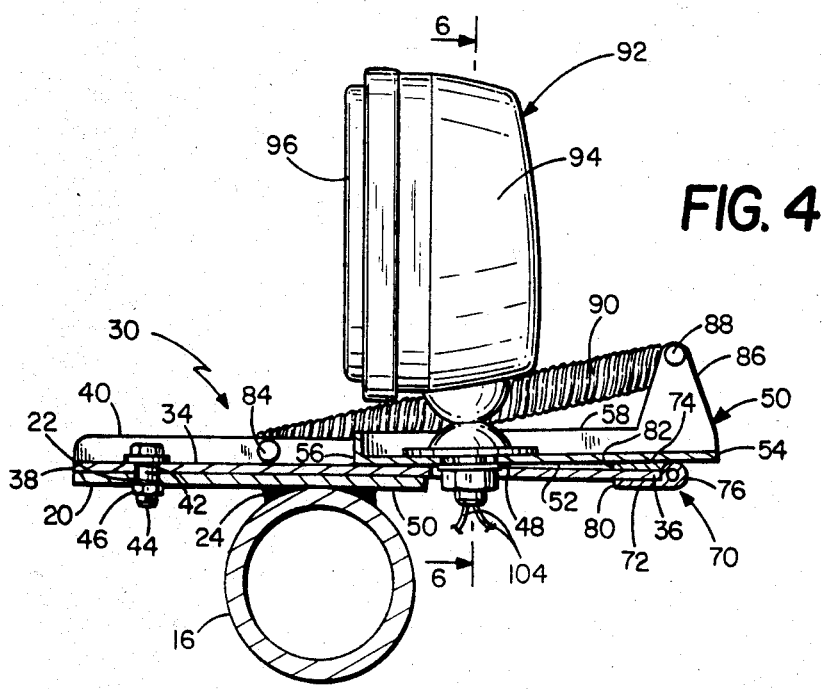
FIG. 4 is a longitudinal sectional view taken in the direction of line 4—4 of FIG. 1.
Figure 5:
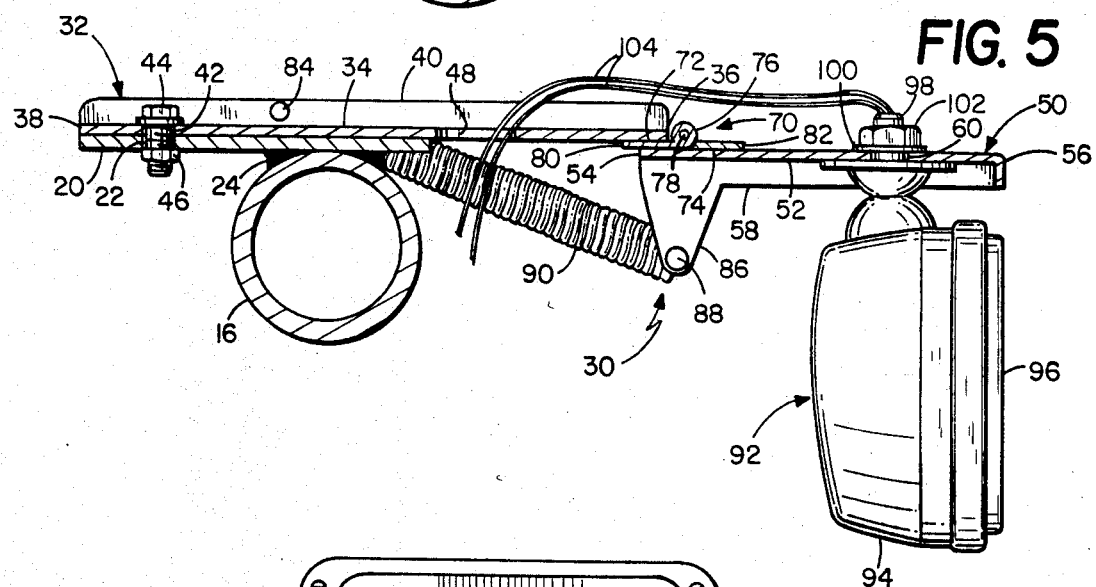
FIG. 5 is a sectional view taken in the direction of line 5—5 of FIG. 2.

The pegs 84 and 88 have circumferential grooves formed therein in order to accommodate the arcuate ends of a coil spring 90. There are actually two coil springs 90, the ends thereof being anchored to the pegs 84 and 88 at one side, and the second coil spring 90 being similarly anchored by reason of the pegs 84 and 88 and the other side. The two springs 90 function in an overcenter manner so as to maintain the bracket 30 in either the position illustrated in FIG. 4 or the position illustrated in FIG. 5. Of course, the positions depicted in FIGS. 4 and 5 are also shown in FIGS. 1 and 2, respectively, as well as in the composite view appearing in FIG. 3.

Although four support pads 20 have been illustrated in FIGS. 1 and 2, only two of these pads 20 are made use of in the exemplary situation. Stated somewhat differently, two brackets 30 have been selected to illustrate our invention, each being a duplicate of the other.

Therefore, each bracket 30 has an auxiliary lamp mounted thereon, the auxiliary lamps each being identified by the reference numeral 92. One of the advantages of the invention is that the lamp 92 can be of conventional construction. Therefore, all that need be described with respect to the lamp 92 is that it includes a metal housing 94 having a lens at 96 so that light from the lamp 92 is directed in whatever direction the lens 96 is facing. Because the auxiliary lamp 92 is conventional, it need only be pointed out that there is a depending threaded bushing 98 extending downwardly through the previously mentioned mounting hole 60 in the web or base plate 52 of the member 50. Encircling the bushing 98 is a washer 100, and a nut 102 when sufficiently tightened holds the bushing 98 in place and hence mounts the auxiliary lamp 92 on the channel-shaped member 50 of the bracket 30. A pair of wires or conductors 104 extend downwardly through the bushing 98, the wires 104 being connected to the electrical system (not illustrated) of the vehicle, more specifically the pickup truck 10.

Having given the foregoing description, the benefits to be derived from a practicing of our invention should be readily appreciated. Nonetheless, it can be explained that the bracket 30 in each instance is constructed so that the auxiliary lamp 92 when mounted on its channel-shaped member 50 can be individually flipped through 180° so that the lamp faces forwardly, as in FIG. 1, or rearwardly, as in FIG. 2, or both forwardly and rearwardly, as in FIG. 3. Thus, if the driver of the pickup truck 10 desires better illumination when driving forwardly, he sees to it that the lamps 92 assume the position illustrated in FIG. 1. On the other hand, if he is backing up and wishes sufficient illumination toward the rear, then to improve his rearward visibility he would select the position of the two brackets 30 appearing in FIG. 2. Sometimes, there is a repeated forward and rearward movement of a vehicle, and this is when the composite relation of the two lamps 92 shown in FIG. 3 would be resorted to.

It perhaps will be well to at this point refer to FIG. 4 where the lamp 92 thereshown corresponds to the lamp position illustrated in FIG. 1 (and one of the lamp positions of FIG. 3). It will be appreciated that in this instance, the coil springs 90 are stretched so that they are pulling the second channel-shaped member 50 in a counterclockwise direction with respect to the first channel-shaped member 32. In other words, the coil springs 90 are elongated or stretched somewhat and by reason of the ears 86 simply tend to rotate the member 50 in a direction so that the web or base plate 34 of the member 32 confronts the upper side of the web or base plate 52 of the member 50. It is when in this position that the bushing 98 extends downwardly through the larger hole 48 formed in the web or base plate 34 of the member 32. This condition is best understood from FIG. 4.

On the other hand, when rearwardly directed illumination is desired, the driver only has to manipulate the particular auxiliary lamp 92 that he wishes to change the direction of so that the bracket 30 assumes the condition depicted in FIG. 5. Whereas the channel-shaped member 50 overlaps the channel-shaped member 32 in FIG. 4, in FIG. 5 the channel-shaped member 50 extends in a straight line or extended relationship with the channel-shaped member 32. It will be appreciated that the coil springs 90 in FIG. 2 (only one appearing therein) pull on the ears 86 so that the end 54 of the web or base plate 52 engages the underside of the web or base plate 34 of the channel-shaped member 32, doing so adjacent the end 36 thereof.

It will be understood that when the bracket 30 is flipped from the position in which it appears in FIG. 4 to that in which it appears in FIG. 5, the already stretched or elongated springs 90 are stretched or elongated still more as the ears 86 pass through a dead center relationship. However, once the ears 86 have moved from their upstanding position, as in FIG. 4, to their downwardly extending position, as shown in FIG. 5, the springs 90 act so as to retain the position of FIG. 5, whereas they have previously maintained the position illustrated in FIG. 4. What should be recognized, though, is that in either the "up" position or "down" position of FIGS. 4 and 5, respectively, the springs 90 function so as to retain the bracket 30 in either of the positions, doing so quite firmly so that the auxiliary lamp 92, irrespective of which direction it faces, does not vibrate any more than if the auxiliary lamp 92 were mounted directly on one of the support pads 20. Because either lamp 92 can be aimed forwardly or rearwardly on an individually selected basis, considerable versatility can be derived when using a bracket 30 constructed in accordance with the teachings of our invention.

We claim:

1. In combination with a vehicle having a roll bar, a flip-over auxiliary lamp bracket comprising first horizontal base means attached to a portion of said roll bar, second base means, an auxiliary lamp mounted on one side of said second base means, means for hingedly connecting one end of said first means to one end of said second means, and over-center springe means for retaining said second means in either an overlapping, generally parallel, relationship in which said one side of said second base means is uppermost with said auxiliary lamp facing forwardly of the vehicle and in which the then underside of said second base means bears against the upper side of said first base means or in an extended, substantially straight line, relationship with said first means in which said one side of said second means is lowermost and said auxiliary lamp faces rearwardly of said vehicle.

2. A combination in accordance with claim 1 in which said retaining means includes at least one ear projecting generally at right angles from said one side of the second means, the over-center spring means including a coil spring having one end attached to the free end of said ear and the coil spring at its other end being attached to said first means at a location near where said first base means is attached to said portion of the roll bar.

3. A combination in accordance with claim 2 in which said second means includes an end portion adjacent its said one end that underlies and bears against an end portion of said first means adjacent its one end when said second means is in said extended relationship.

4. A combination in accordance with claim 3 in which said means for hingedly connecting said first means to said second means includes a pair of leaves, one of said leaves being secured directly to said end portion of said first means and the other of said leaves being secured directly to a portion of said second means spaced from its said end portion.

5. In combination, a horizontal pad mounted to a vehicle, a first channel-shaped member attached to said pad having an ear extending generally at right angles thereto, a second channel-shaped member, hinge means pivotally connecting one end of said second channel-shaped member to one end of said first channel-shaped member, an auxiliary lamp mounted on said second channel-shaped member including a lens member, means for maintaining said second channel-shaped member in either an overlapping, generally parallel, relationship with said first channel-shaped member in which the lens member of said auxiliary lamp faces in one direction or in an extended, substantially straight line, relationship relative to said first channel-shaped member in which the lens member of said auxiliary lamp faces in an opposite direction, said maintaining means including a coil spring having one end attached to said first channel-shaped member at a location spaced from said hinge means and having its other end attached to the free end of said ear member and to said channel-shaped member at a location also spaced from said hinge means, said lamp being mounted on said second channel-shaped member to that it faces away from said ear member in both said one and opposite directions, a vehicle roll bar, said pad being attached to said roll bar, whereby the lens member of said auxiliary lamp faces forwardly relative to the vehicle when said bracket is in one position and the lens member of said lamp faces rearwardly, relative to the vehicle when said bracket is in its other position.

6. A flip-over lamp bracket for vehicles comprising a first plate for attachment to a portion of a vehicle, a second plate for supporting an auxiliary lamp thereon, a hinge unit including a first leaf secured to one end of said first plate and including a second leaf secured to one end of said second plate, an ear adjacent said one end of said second plate and projecting generally at right angles with respect to said second plate and at right angles with respect to said second leaf, and a coil spring having one end thereof anchored to the free end of said ear and its other end anchored at a fixed location spaced from said first leaf and adjacent to said first plate.

* * * * *